(12) United States Patent
Maharyta et al.

(10) Patent No.: US 8,248,081 B2
(45) Date of Patent: Aug. 21, 2012

(54) CALIBRATION OF SINGLE-LAYER TOUCH-SENSOR DEVICE

(75) Inventors: Andriy Maharyta, Lviv (UA); Robert Michael Birch, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1028 days.

(21) Appl. No.: 12/200,623

(22) Filed: Aug. 28, 2008

(65) Prior Publication Data

US 2009/0066674 A1    Mar. 12, 2009

Related U.S. Application Data

(60) Provisional application No. 60/970,440, filed on Sep. 6, 2007.

(51) Int. Cl.
*G01R 35/00* (2006.01)
(52) U.S. Cl. ............................................... 324/601
(58) Field of Classification Search .................. None
See application file for complete search history.

(56) References Cited

U.S. PATENT DOCUMENTS

| 6,650,319 | B1 * | 11/2003 | Hurst et al. | 345/173 |
| 2003/0028346 | A1 | 2/2003 | Sinclair et al. | |
| 2005/0041018 | A1 * | 2/2005 | Philipp | 345/178 |
| 2006/0202969 | A1 | 9/2006 | Hauck | |
| 2006/0290678 | A1 | 12/2006 | Lii | |
| 2008/0094376 | A1 * | 4/2008 | Dietz | 345/179 |

OTHER PUBLICATIONS

International Search Report and Written Opinion of the International Searching Authority, PCT/US08/010418 filed Sep. 5, 2008, mailed Nov. 18, 2008.

\* cited by examiner

*Primary Examiner* — Roberto Velez (57) ABSTRACT

A single-layer touch-sensor device having a calibration mechanism coupled therewith is described. Included is a charge measurement circuit coupled, by a pair of electrical traces, with a slider of the single-layer touch-sensor device. A pair of calibration capacitors is included, each calibration capacitor coupled, between the slider and the charge measurement circuit, with one of the pair of electrical traces. A pair of connection switches is also included, each connection switch coupled with one of the pair of calibration capacitors.

20 Claims, 10 Drawing Sheets

CALIBRATION OF SINGLE-LAYER TOUCH-SENSOR DEVICE

CROSS REFERENCE TO RELATED APPLICATIONS

This application claims the benefit of U.S. Provisional Application No. 60/970,440, filed Sep. 6, 2007, the entire contents of which are hereby incorporated by reference herein.

TECHNICAL FIELD

The disclosure is in the field of capacitive sensing devices and, in particular, the calibration of single-layer touch-sensor devices.

BACKGROUND

Computing devices, such as notebook computers, personal data assistants (PDAs), mobile communication devices, and portable entertainment devices (such as handheld video game devices, multimedia players, and the like) have user interface devices, which are also known as human interface devices (HID), that facilitate interaction between the user and the computing device. One type of user-interface device that has become more common is a touch-sensor pad (also known as a "touchpad"). A touchpad replicates mouse X/Y movement by using two defined axes, which contain a collection of sensor elements that detect the position of a conductive object such as a finger. Mouse right/left button clicks can be replicated by two mechanical buttons, located in the vicinity of the touchpad, or by tapping commands on the touchpad itself. The touchpad provides a user-interface device for performing such functions as positioning a cursor and selecting an item on a display. These touch pads may include multi-dimensional sensor arrays for detecting movement in multiple axes. The sensor array may include a one-dimensional sensor array to detect movement in one axis. The sensor array may also be two-dimensional to detect movement in two axes.

One type of touchpad operates by way of capacitance sensing utilizing capacitive sensors. The capacitance detected by a capacitive sensor changes as a function of the proximity of a conductive object to the sensor. The conductive object can be, for example, a stylus or a user's finger. In a touch-sensor device, a change in capacitance detected by each sensor in the X and Y dimensions of the sensor array, due to the proximity or movement of a conductive object, can be measured by a variety of methods. Regardless of the method, usually an electrical signal representative of the capacitance detected by each capacitive sensor is processed by a processing device, which in turn develops electrical signals representative of the position of the conductive object in relation to the touch-sensor pad in the X and Y dimensions. A touch-sensor strip, slider, or button operates on the same capacitance-sensing principle.

DETAILED DESCRIPTION

A mechanism and a method for calibrating a single-layer touch-sensor device are described herein. In the following description, numerous specific details are set forth, such as specific capacitor arrangements, in order to provide a thorough understanding of embodiments of the present invention. It will be apparent to one skilled in the art that embodiments of the present invention may be practiced without these specific details. In other instances, well-known fabrication operations, such as layer patterning operations, are not described in detail in order to not unnecessarily obscure embodiments of the present invention. Furthermore, it is to be understood that the various embodiments shown in the Figures are illustrative representations and are not necessarily drawn to scale.

Disclosed herein is a single-layer touch-sensor device having a calibration mechanism coupled therewith. The single-layer touch-sensor device having the calibration mechanism coupled therewith may include a charge measurement circuit coupled, by a pair of electrical traces, with a slider of the single-layer touch-sensor device. In one embodiment, a pair of calibration capacitors is included, each calibration capacitor coupled, between the slider and the charge measurement circuit, with one of the pair of electrical traces. A pair of connection switches is also included, each connection switch coupled with one of the pair of calibration capacitors. A method for calibrating a single-layer touch-sensor device may include first providing the above single-layer touch-sensor device having the calibration mechanism coupled therewith. In one embodiment, a pair of calibration capacitors is connected to a pair of electrical traces of the calibration mechanism. A pair of connection switches is then connected to the pair of calibration capacitors to generate a simulated touch result. Finally, the single-layer touch-sensor device is calibrated based on the simulated touch result.

A single-layer touch-sensor device having a calibration mechanism coupled therewith may be calibrated without the use of manual touch. For example, in accordance with an embodiment of the present invention, a calibration mechanism is used for applications having a single-layer resistance-capacitance identifier of a finger or finger simulator touch coordinate. In one embodiment, for single-axis touch definition, a calibration mechanism having two calibration capacitors is used. In one embodiment, for two-axes touch definition, a calibration mechanism having four calibration capacitors is used. In accordance with an embodiment of the present invention, the term "touch" implies galvanically isolated introduction of certain capacitance into a measuring system with a finger or a finger simulator. Often, touch-sensor devices are calibrated in the end product directly by manual touch calibration. This manual touch calibration requirement may be performed to address coordinate uncertainty of an application point, the near equivalent capacitance value of a panel, the initial spread of the resistance of a panel, and the equivalent resistance of analog circuits used for the electronic part of a touch-sensor device. Instead, in one embodiment of the present invention, no manual calibration is used for a touch-sensor device having a calibration mechanism coupled therewith. For example, in one embodiment, a touch-sensor device having a calibration mechanism coupled therewith enables compensation of measurement circuit and panel parameters (panel and switches resistance) drift.

Capacitive touch pads may be constructed on four-layer and two-layer printed circuit boards (PCBs). For example, in a four-layer touchpad, the first and second layers contain the horizontal and vertical sensor elements (also referred to as pads) and interconnecting sensor traces that form the capacitive sensor matrix. The third layer contains a ground plane and the fourth layer contains the controller and associated circuitry and interconnections to the capacitive sensor matrix. In some two-layer touch pads, one layer contains the horizontal sensor elements and their corresponding interconnecting sensor traces. The second layer contains the vertical sensor elements and their interconnecting sensor traces. The controller resides on either of the two layers. It should be noted that in the field of capacitive touch pads, in reference to multiple-layer touch pads (e.g., "two-layer" or "four-layer" touch pads), the term "layer" is used to refer to a side of a non-conductive substrate upon which conductive material is disposed.

Figure 1:
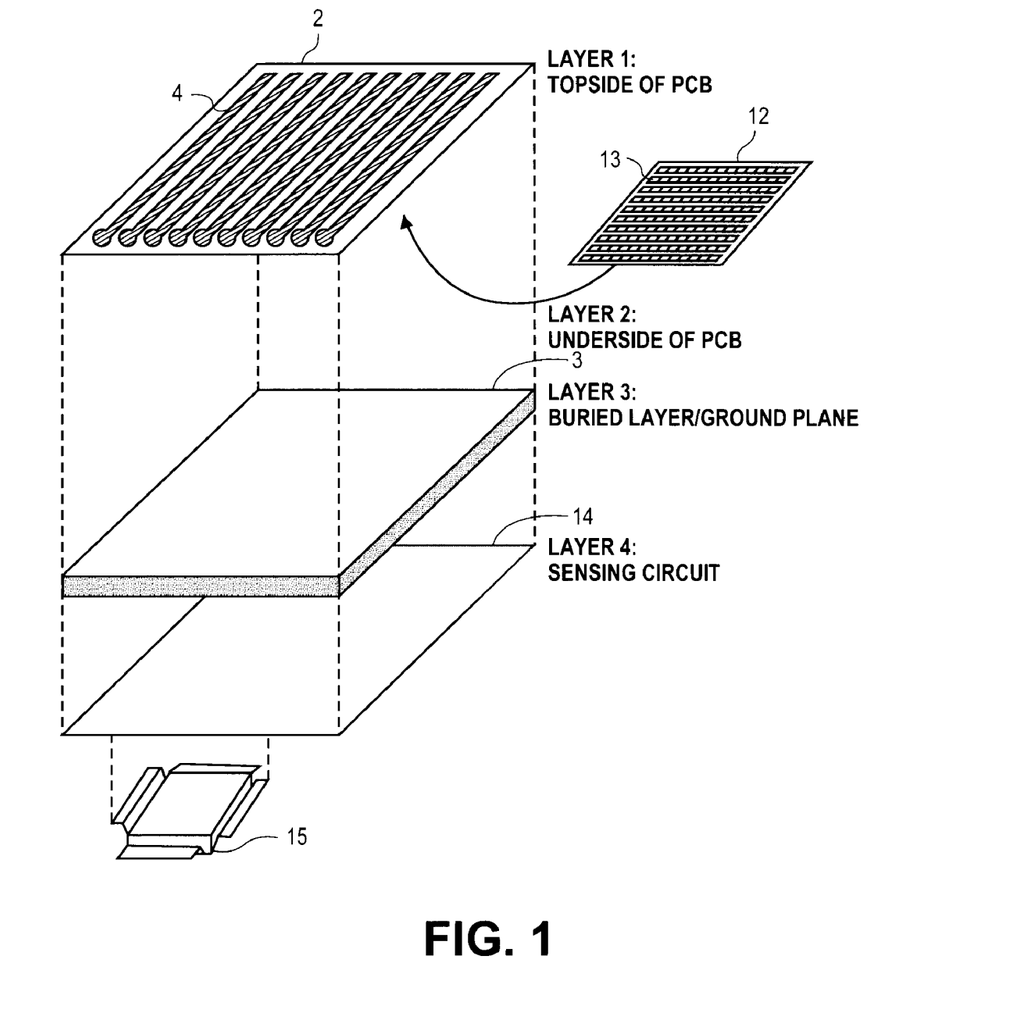
FIG. 1 illustrates an isometric view of a conventional four-layer touchpad, in accordance with an embodiment of the present invention.

FIG. 1 illustrates an isometric view of a four-layer touchpad, in accordance with an embodiment of the present invention. The first layer 2 resides on the topside of the PCB having sensor traces 4 disposed in the vertical direction. These vertical sensor traces connect to vertically-aligned sensor elements disposed on the first layer (not shown). The second layer 12 resides on the underside of the PCB having sensor traces 13 disposed in the horizontal direction. These horizontal sensor traces connect to horizontally-aligned sensor elements disposed on the second layer (not shown). The third layer 3 is buried in the substrate of the PCB and houses the ground plane, which may connect to the topside or underside of the PCB using conductive traces and vias. Lastly, the fourth layer 14 includes the sensing circuit 15.

Figure 2:
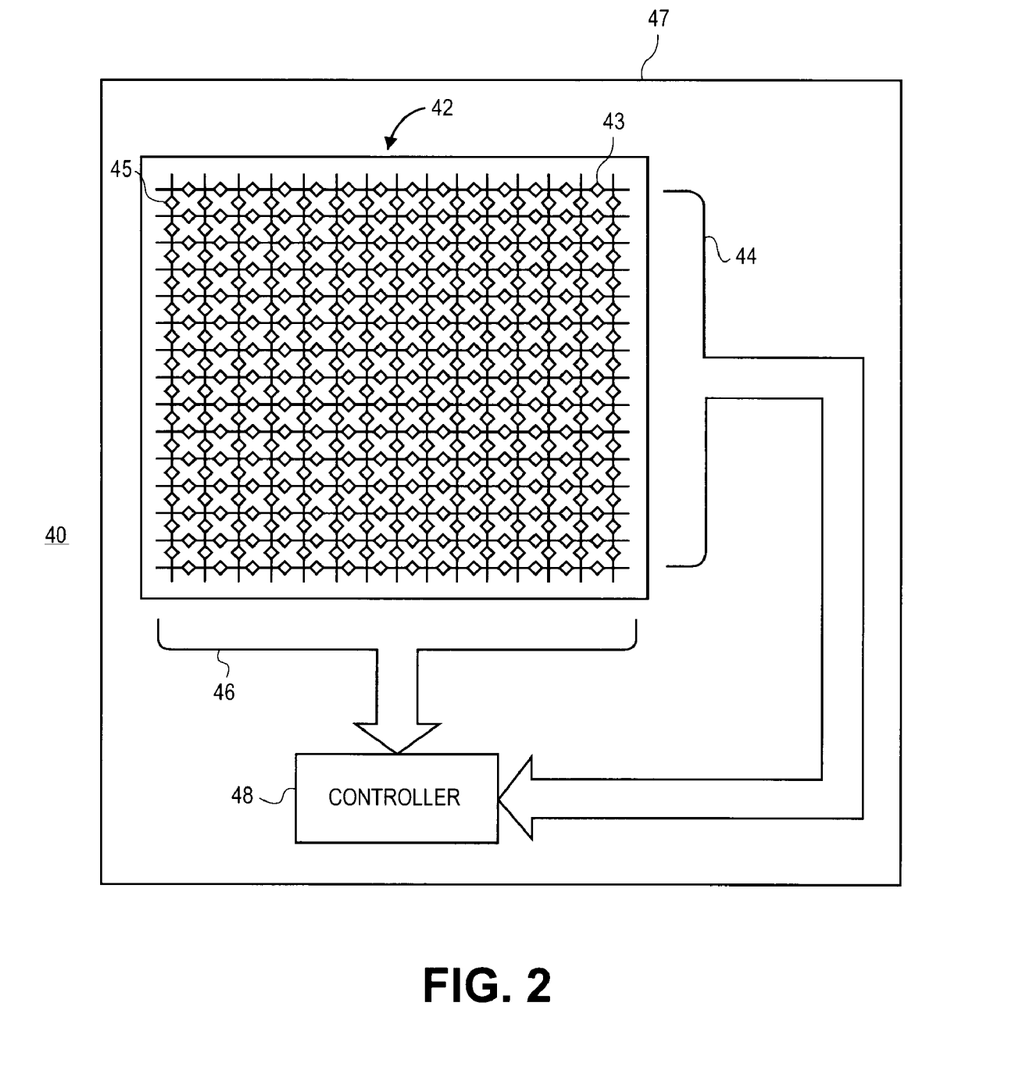
FIG. 2 illustrates an isometric view of a conventional two-layer touchpad, in accordance with an embodiment of the present invention.

FIG. 2 illustrates an isometric view of a two-layer touchpad, in accordance with an embodiment of the present invention. The two-layer touchpad 40 illustrated in FIG. 2 includes the following: a capacitive sensor matrix 42, or array, having horizontal sensor elements 45 and vertical sensor elements 43 (represented by diamonds) and interconnecting horizontal sensor traces 44 and vertical sensor traces 46. A controller chip 48 is disposed on the same side of the PCB 47 as the sensor array 42. Although the horizontal sensor traces 44 and vertical sensor traces 46 appear to reside on the same layer in FIG. 2, such is only for conceptual purposes to understand the functional inter-relationship of the horizontal and vertical sensor elements of the array 42. As would be apparent to one of ordinary skill in the art, the horizontal sensor elements 43 and their interconnecting row sensor traces 44 reside on a different layer than the vertical sensor elements 45 and their interconnecting column sensor traces 46. The controller chip 48 resides on one of these two different layers. Accordingly, the touchpad illustrated in FIG. 2 is a "two-layer" touchpad.

Referring again to FIG. 2, the controller chip 48 and the sensor elements 43 and 45 are disposed on two non-overlapping regions of the same circuit board 42. As such, circuit board 47 may be substantially larger than the touch-sensor array 42 in order to provide area for mounting the controller chip 48, associated circuitry, and interconnections between the controller chip 48 and the sensor elements 43 and 45.

Figure 3:
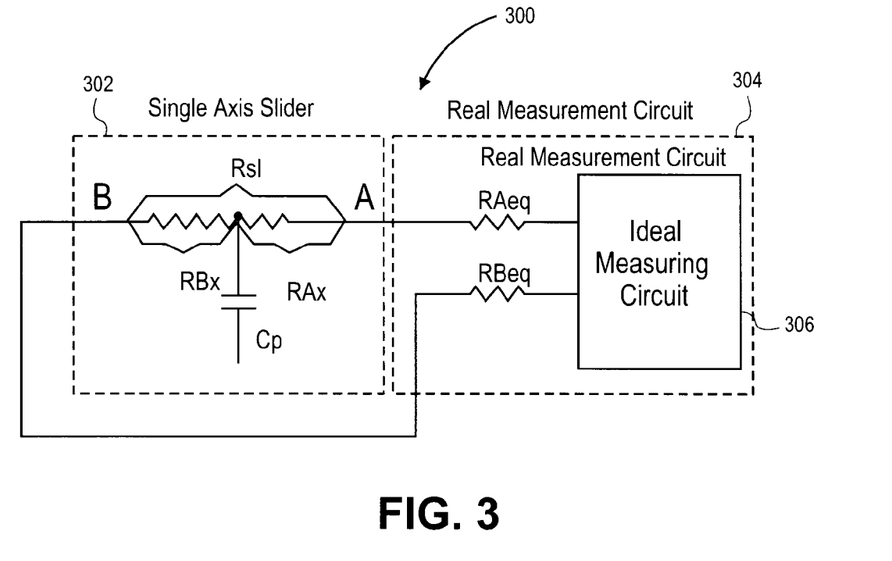
FIG. 3 illustrates a simplified schematic for a slider with linear distribution of resistance, in accordance with an embodiment of the present invention.

For many touch-sensor applications, the resistance of a switch is comparable with the resistance of a panel. Consequently, measuring error introduced by switch resistance can be intolerable for such applications. Thus, a touch-sensor device may have to be calibrated and, perhaps, periodically calibrated to ensure that the positioning of a touch thereon corresponds with an appropriate coordinate signal determination. FIG. 3 illustrates a simplified schematic for a slider with linear distribution of resistance, in accordance with an embodiment of the present invention.

Referring to FIG. 3, a portion 300 of a touch-sensor device includes a single-axis slider 302 and a real measurement circuit 304. An ideal measuring circuit 306 may be included in real measurement circuit 304, as depicted in FIG. 3. Cp is the equivalent capacitance of single-axis slider 302, $R_{sl}$ is the total resistance of single-axis slider 302, $R_{BX}$ and $R_{AX}$ represent portions of the resistance of single-axis slider 302 used for the definition of equivalent capacitance Cp application coordinates, and $RA_{eq}$ and $RB_{eq}$ represent equivalent resistances of the measuring part of the touch-sensor device. For the given schematic of FIG. 3, the coordinate is calculated according to equation 1.

$$K_X = \frac{RB_X + RB_{eq}}{RB_X + RB_{eq} + RA_X + RA_{eq}} \qquad (1)$$

Most measuring methods allow correspondence of coordinates proportional to the sums $R_{AX}+RA_{eq}$ and $R_{BX}+R_{Beq}$. However, in order to define the touch coordinate, it is necessary to obtain these values in the physical range of a touch work space, e.g., proportional to $R_{AX}$ and $R_{BX}$. Thus, calibration is performed for the definition of the physical range of the work space of single-axis slider 302. Otherwise, when no touch has occurred, the calculated value will define the application coordinate of equivalent capacitance of a measured portion of the touch-sensor device. And, when a touch event has occurred, touch of a surface of single-axis slider 302 causes geometrical and electrical offset of an application point of equivalent capacitance of a measured part of the device.

Figure 4:
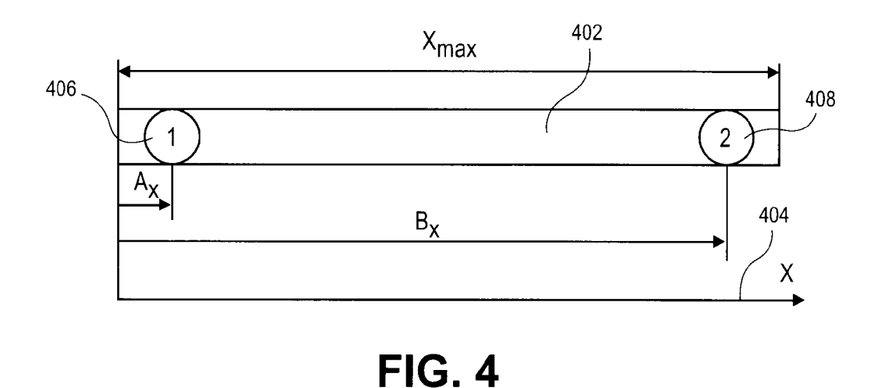
FIG. 4 illustrates a dual-touch calibration procedure in one dimension, in accordance with an embodiment of the present invention.

FIG. 4 illustrates a dual-touch calibration procedure in one dimension, in accordance with an embodiment of the present invention. In the calibration procedure, touches are performed at two different points A (touch 1, 406) and B (touch 2, 408), along axis 404, with known absolute coordinates relative to the physical range of a one-dimensional work space 402, e.g., $A_X$ and $B_X$. The relative coordinates of points A and B, e.g., $KA_X$ and $KB_X$, are calculated by equation 1, above. Calculation of initial offset of coordinate scale and scale coefficient is next calculated according to equation 2, which provides the absolute coordinate.

$$b = KB_X - \left(B_X \cdot \frac{KA_X - KB_X}{A_X - B_X}\right) \qquad (2)$$

The scale coefficient is provided by equation 3.

$$a = \frac{A_X - B_X}{KA_X - KB_X} \qquad (3)$$

Finally, a coordinate calculation taking into account the above calibration results is obtained using a linear coordinate conversion, according to equation 4.

$$X = (K_X - b) \cdot a \text{ or } X = a \cdot K_X - a \cdot b \qquad (4)$$

This calibration may be periodically repeated due to temperature drift, nonlinear power supply dependence, and switching voltage and current dependence of a touch-sensor device.

Figure 5:
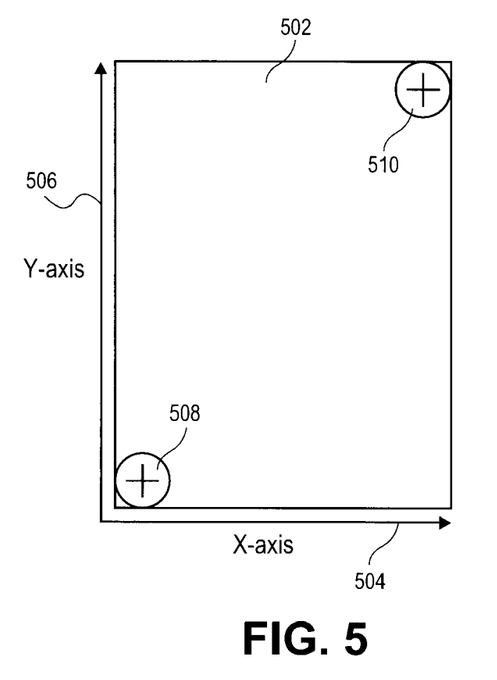
FIG. 5 illustrates a dual-touch calibration procedure in two dimensions, in accordance with an embodiment of the present invention.

A similar method may be utilized for the calibration of two-dimensional panels. Such panels can be considered as a two-axis slider, using the model consisting of two sliders. FIG. 5 illustrates a dual-touch calibration procedure in two dimensions, in accordance with an embodiment of the present invention. Referring to FIG. 5, a minimum of two calibration points, 508 and 510, are specified for a two dimensional calibration. In accordance with an embodiment of the present invention, points 508 and 510 are located at positions differing in both the X-axis 504 location and the Y-axis 506 location of a panel 502. In order to optimize the mathematical calculations, the distance between points 508 and 510 should be as large as possible.

Figure 6:
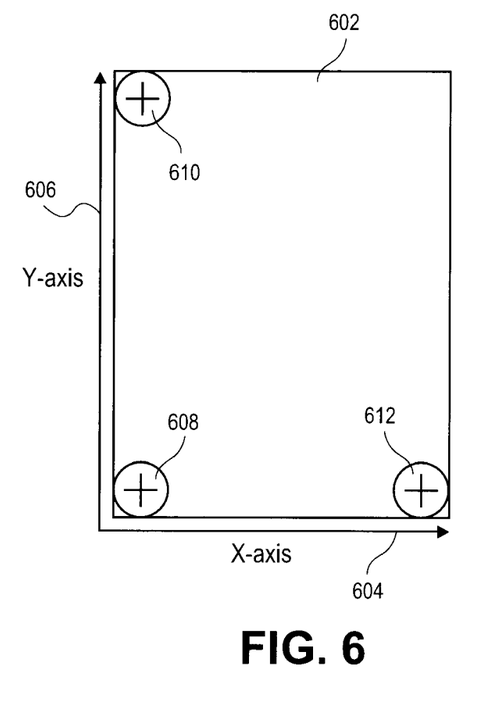
FIG. 6 illustrates a triple-touch calibration procedure in two dimensions, in accordance with an embodiment of the present invention.

If the two points used for the calibration of two-dimensional panels fall on the same axis in one direction, at least three points are specified for calibration. For example, FIG. 6 illustrates a triple-touch calibration procedure in two dimensions, in accordance with an embodiment of the present invention. Referring to FIG. 6, three points 608, 610 and 612 are touched along axes 604 and 606 of panel 602.

Figure 7:
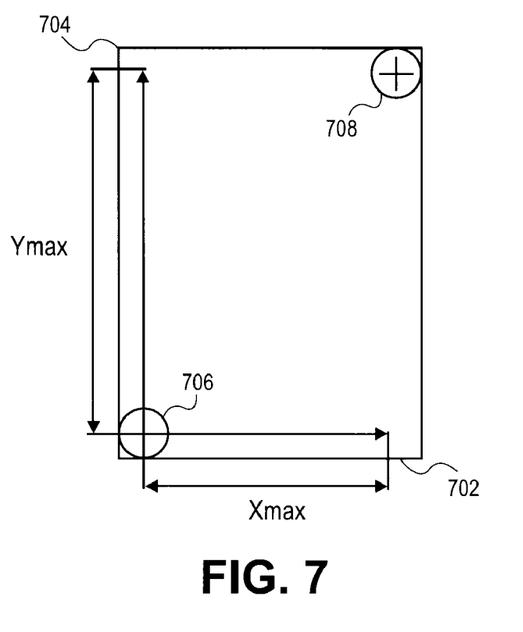
FIG. 7 illustrates a coordinate range in a dual-touch calibration procedure, in accordance with an embodiment of the present invention.
Figure 8A:
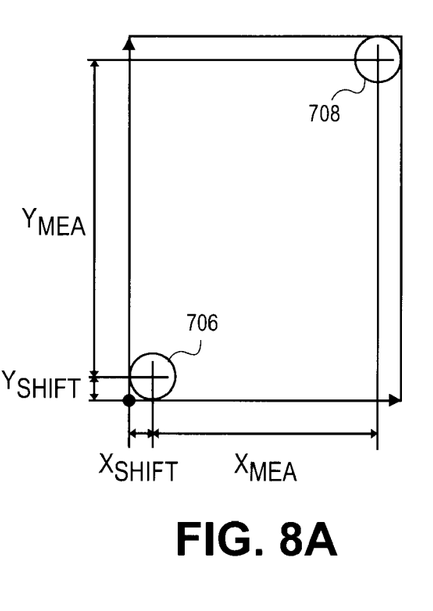
FIG. 8A illustrates a calibration correction for a two-axis calibration, in accordance with an embodiment of the present invention.
Figure 8B:
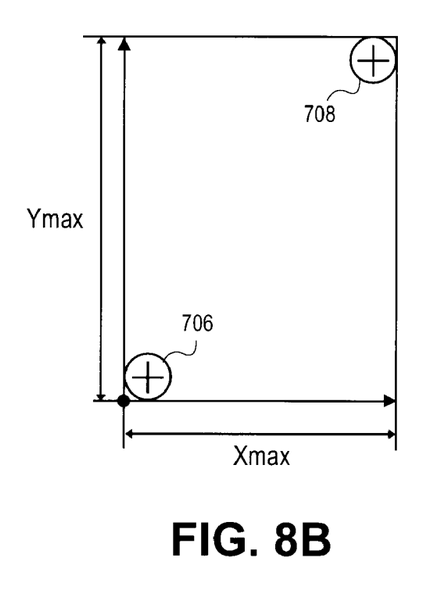
FIG. 8B illustrates a calibration correction for a two-axis calibration, in accordance with an embodiment of the present invention.

Using values measured during a dual-touch calibration against the chosen origin of coordinates, the offset (absolute coordinate of origin of a relative coordinate system) and scale coefficients for each coordinate are calculated. After measuring, in calibration points, the correction of the obtained values for the calibration points is specified. One approach is shown in FIG. 7. FIG. 7 illustrates a coordinate range in a dual-touch calibration procedure, in accordance with an embodiment of the present invention. Referring to FIG. 7, the center of coordinates 706 and 708 is correlated with a calibration point along axes 702 and 704. However, when either axis 702 or 704 of coordinates 706 and 708 is shifted relative to calibration points, a correction of calculated values is specified. For example, FIGS. 8A and 8B illustrate a calibration correction for a two-axis calibration, in accordance with an embodiment of the present invention. Referring to FIG. 8A, the measured values of points 706 and 708, as shifted from their original coordinates, are transposed to be fixed once again with their original coordinates, as depicted in FIG. 8B. That is, in accordance with an embodiment of the present invention, performing a calibration shifts points 706 and 708 to correspond to their original coordinates.

The above calibration procedure may be carried out using actual touches on a panel or slider. However, in an aspect of the present invention, touches are simulated or imitated by a touch simulation circuit, the above calibration is performed based on the simulated touches, and a touch-sensor device is calibrated without the need for a manual touch. Thus, in accordance with an embodiment of the present invention, a calibration method without mechanical device manipulation is performed. For example, FIG. 9 illustrates a one dimensional slider with calibration capacitors, in accordance with an embodiment of the present invention.

Figure 9:
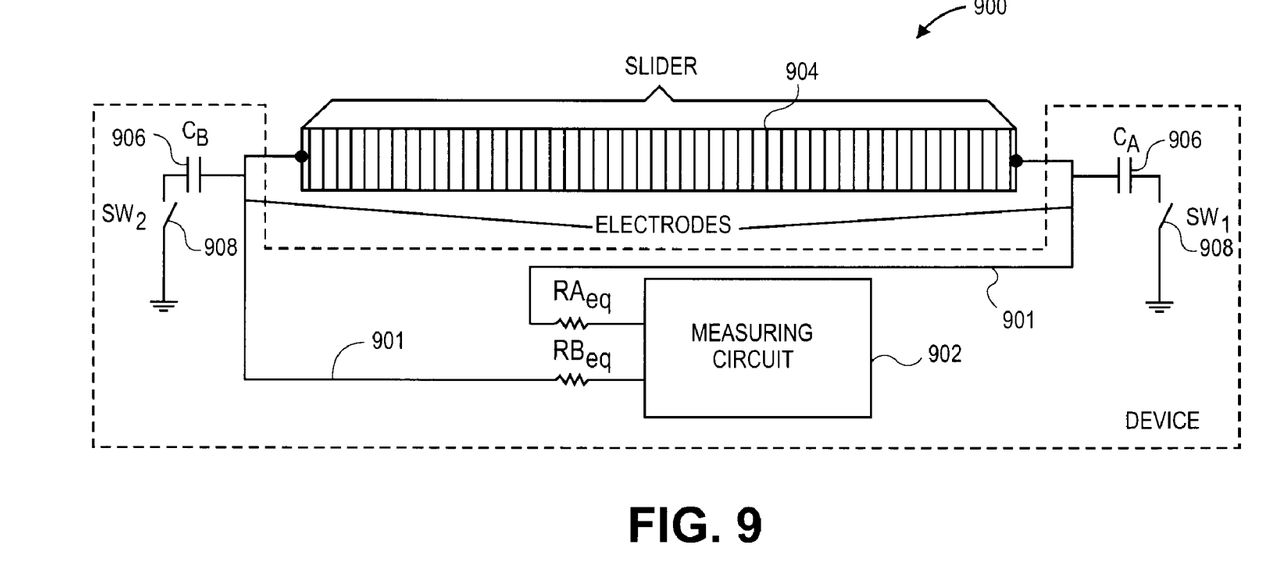
FIG. 9 illustrates a one dimensional slider with calibration capacitors, in accordance with an embodiment of the present invention.

Referring to FIG. 9, a portion 900 of a single-layer touch-sensor device having a calibration mechanism coupled therewith includes a charge measurement circuit 902 coupled, by a pair of electrical traces 901, with a slider 904 of the single-layer touch-sensor device. A pair of calibration capacitors 906 is also included, each calibration capacitor 906 coupled, between slider 904 and charge measurement circuit 902, with one of the pair of electrical traces 901. A pair of connection switches 908 is also included, each connection switch 908 coupled with one of the pair of calibration capacitors 906. In accordance with an embodiment of the present invention, the calibration mechanism is configured to calibrate the single-layer touch-sensor device without the use of a manual touch. In an embodiment, the single-layer touch-sensor device having the calibration mechanism coupled therewith further includes a panel having a set of edges, the panel coupled with slider 904, wherein the pair of calibration capacitors 906 is configured to simulate touch at the set of edges of the panel. In one embodiment, the calibration mechanism is configured to calculate a coordinate gain or a coordinate offset based on a signal change of the panel, the signal change caused by at least one of the pair of calibration capacitors 906. In a specific embodiment, the pair of calibration capacitors 906 is housed in the single-layer touch-sensor device. In an alternative specific embodiment, the pair of calibration capacitors 906 is housed external to the single-layer touch-sensor device. In one embodiment, the pair of connection switches 908 is a pair of analog switches. In another embodiment, the pair of connection switches 908 is a pair of digital switches.

Figure 10:
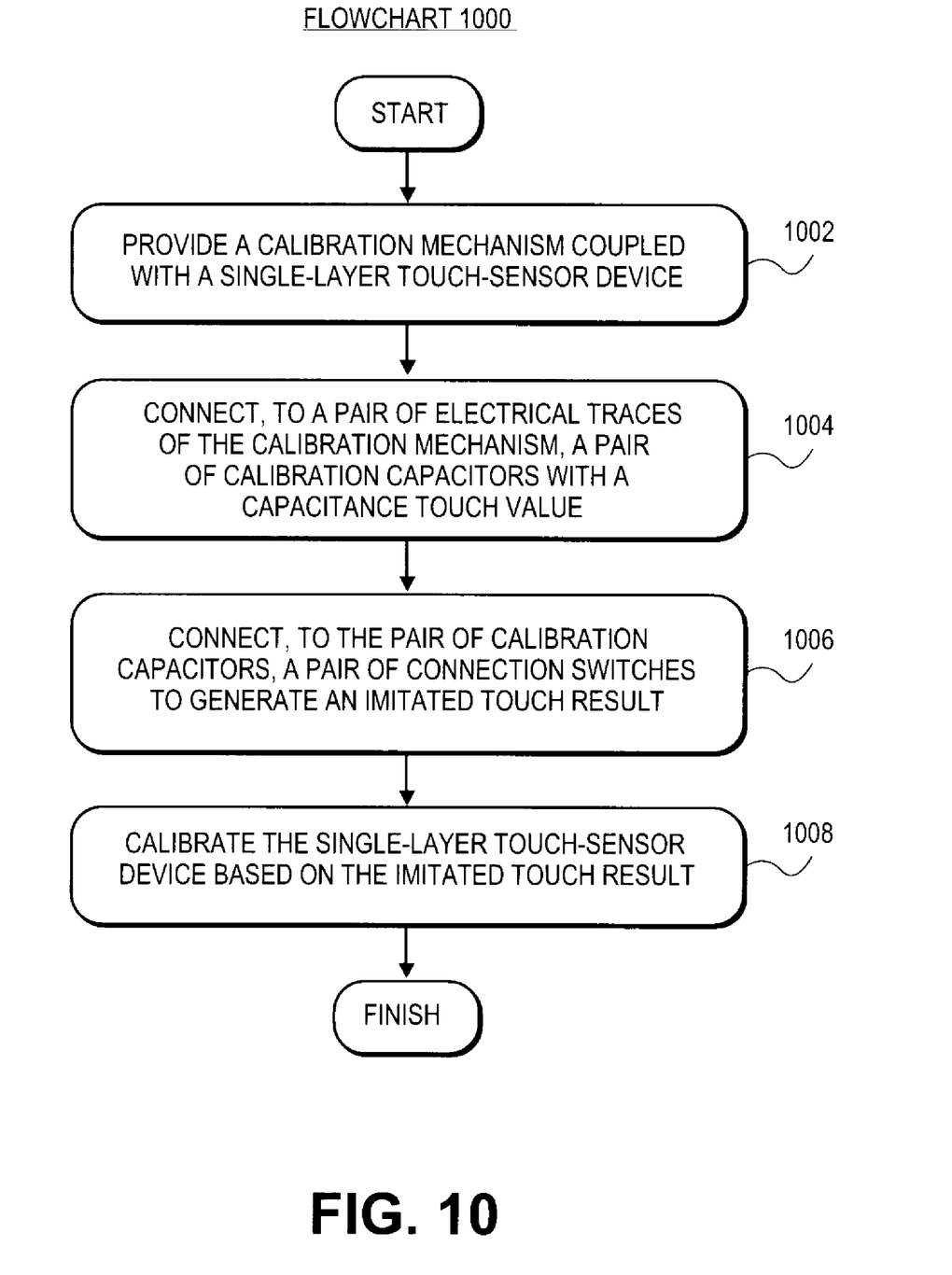
FIG. 10 is a flowchart representing a series of operations in a calibration method for a single-layer touch-sensor device, in accordance with an embodiment of the present invention.

An aspect of the present invention includes a method of calibrating a single-layer touch-sensor device. FIG. 10 is a Flowchart 1000 representing a series of operations in a calibration method for a single-layer touch-sensor device, in accordance with an embodiment of the present invention. Referring to operation 1002 of Flowchart 1000, a calibration mechanism coupled with a single-layer touch-sensor device is provided. In an embodiment, the calibration mechanism includes a charge measurement circuit coupled, by a pair of electrical traces, with a slider of the single-layer touch-sensor device. A pair of calibration capacitors is included, each calibration capacitor coupled, between the slider and the charge measurement circuit, with one of the pair of electrical traces. Also included is a pair of connection switches, each connection switch coupled with one of the pair of calibration capacitors. Referring to operation 1004 of Flowchart 1000, the pair of calibration capacitors is connected to the pair of electrical traces with a capacitance touch value. Referring to operation 1006 of Flowchart 1000, the pair of connection switches is connected to the pair of calibration capacitors in order to generate a simulated or imitated touch result. Referring to operation 1008 of Flowchart 1000, the single-layer touch-sensor device is calibrated based on the simulated touch result. In accordance with an embodiment of the present invention, calibrating the single-layer touch-sensor device includes calibrating without the use of a manual touch. In one embodiment, connecting the pair of connection switches to generate the simulated touch result includes generating the simulated touch result at a set of edges of a panel of the single-layer touch-sensor device. In a specific embodiment, calibrating the single-layer touch-sensor device includes calculating a coordinate gain or a coordinate offset based on a signal change of the panel, the signal change caused by at least one of the pair of calibration capacitors. In one embodiment, calibrating the single-layer touch-sensor device includes repeating the generating of the simulated touch result periodically to compensate for calibration drift in the single-layer touch-sensor device. In an embodiment, connecting the pair of calibration capacitors to the pair of electrical traces includes connecting with a capacitance touch value approximately in the range of 0.5-5 picofarads.

Figure 11:
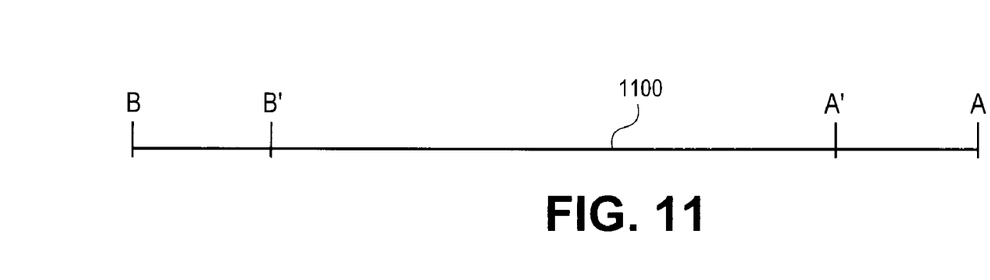
FIG. 11 illustrates a pair of points specifying calibration along a single axis slider, in accordance with an embodiment of the present invention.
Figure 12:
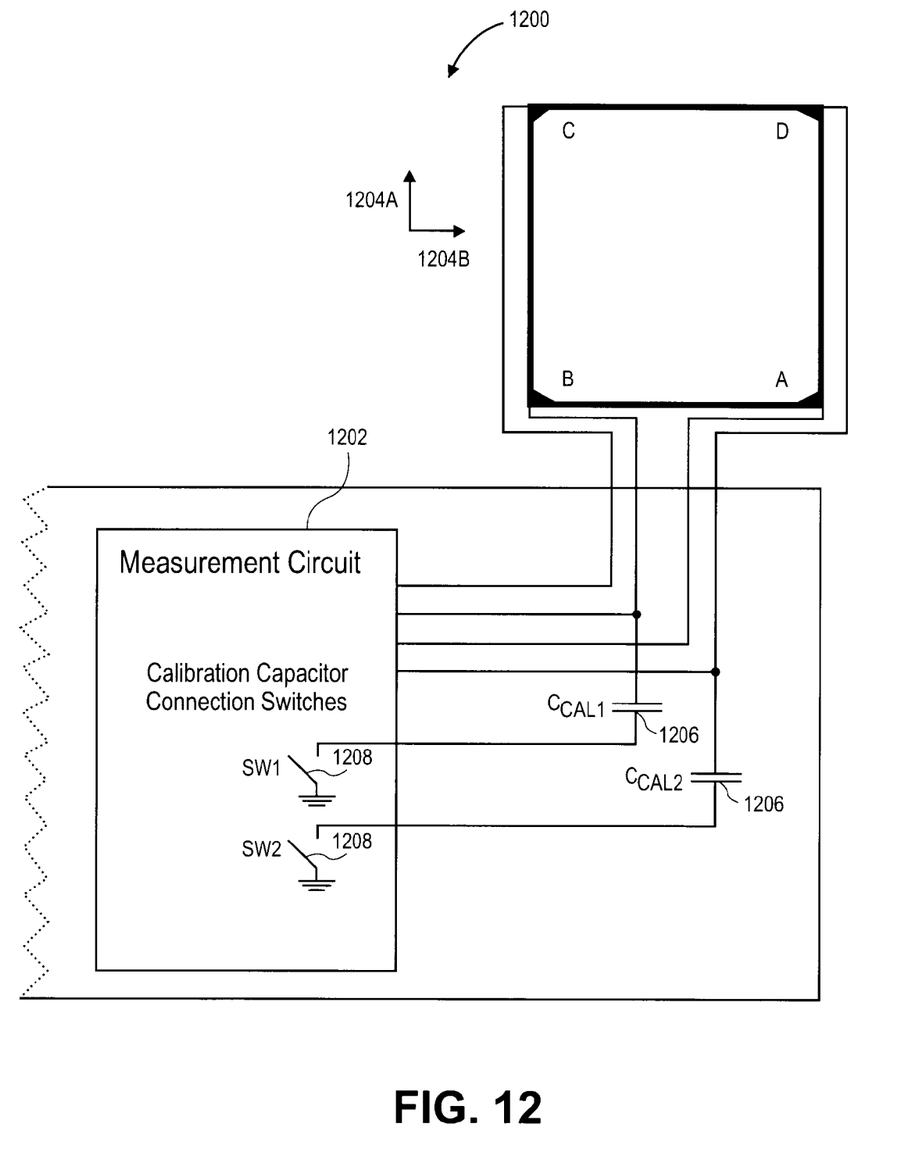
FIG. 12 illustrates two pairs of points specifying calibration along two sliders, in accordance with an embodiment of the present invention.

In order to exemplify the above described calibration method, FIG. 11 illustrates a pair of points specifying calibration along a single axis slider, in accordance with an embodiment of the present invention. Referring to FIG. 11, the resistance of an electrode is comparable with the resistance of a slider 1100. This results in the reflection of physical work space B-A into the calculation B'-A'. In order to correct for this mismatch, e.g. in order to calibrate a device, a calibration method such as the one described above may be used to adjust the points back to B-A along slider 1100. The above method may also be used for the calibration of sliders in along two axis, e.g. for panels. FIG. 12 illustrates two pairs of points specifying calibration along two sliders, in accordance with an embodiment of the present invention.

Figure 13:
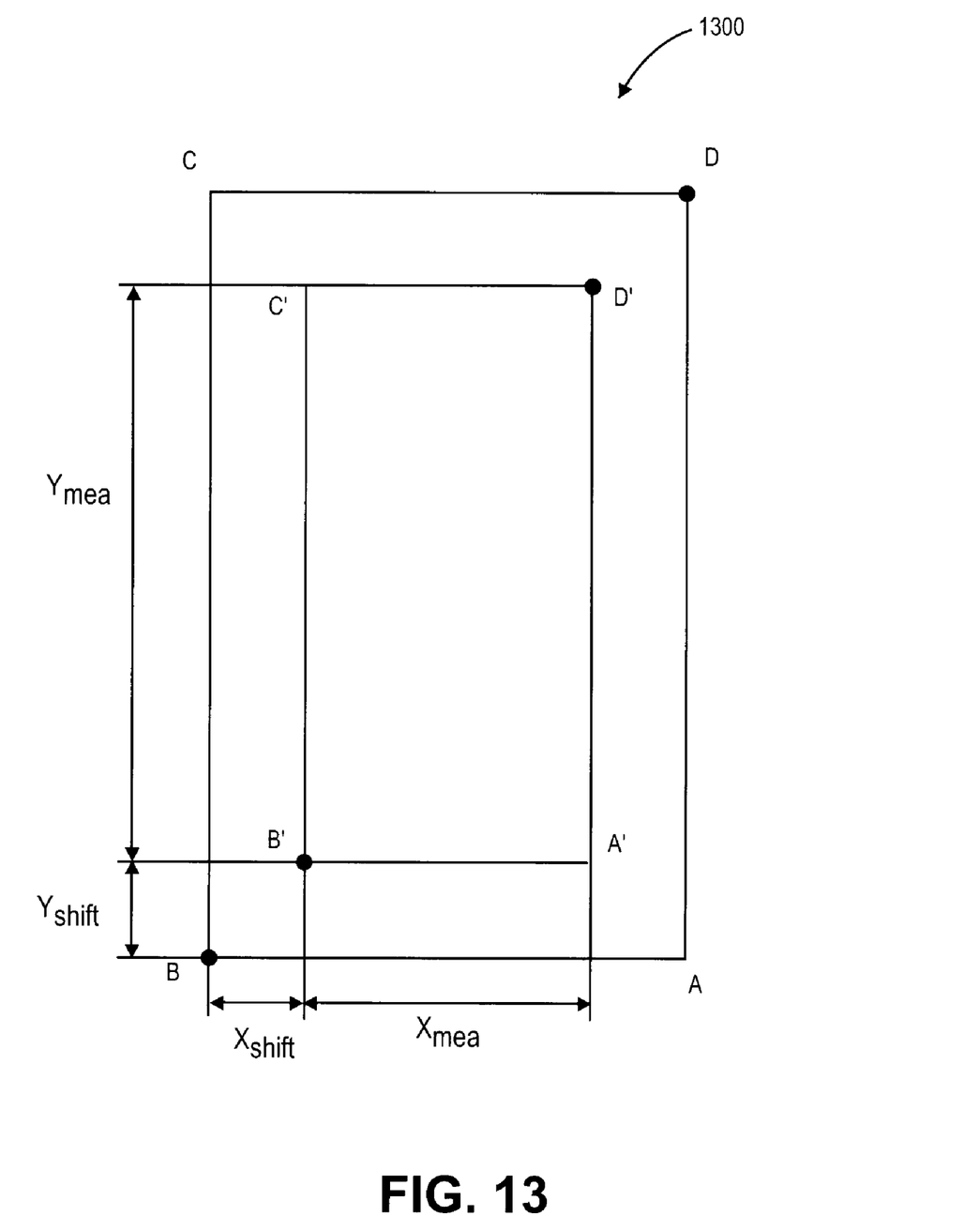
FIG. 13 illustrates a set of four points specifying calibration along two sliders, in accordance with an embodiment of the present invention.

Referring to FIG. 12, the electrodes connecting corners B and D of device 1200 with are used for calibration. Calibration capacitors 1206 are disposed on a printed circuit board of device (PCB) and are coupled with connection switches 1208 and measurement circuit 1202. A first axis runs from point B to C along axis 1204A and a second axis runs from point B to A along axis 1204B. FIG. 13 illustrates a set of four points specifying calibration along two sliders, in accordance with an embodiment of the present invention. Referring to FIG. 13, the physical space of a panel 1300 defined by points ABCD is limited by the smaller rectangle A'B'C'D' when coordinate calculation is performed on the basis of non-calibrated signals. Such mismatch arises when the points of the metering capacitors are not on the points B and D directly on the panel, but are instead beyond the bounds of the panel. In accordance with an embodiment of the present invention, a non-touch calibration method is used to calibrate drifted points A'B'C'D' to translate to original points ABCD. The result of a single-dimension slider calibration is a two value calculation: absolute offset value $b_x$ and scale coefficient $a_x$. On the other hand, here, the result of two-dimensional panel calibration is a four value calculation: axes absolute offset values $b_x$ and $b_y$ and axes scale coefficients $a_x$ and $a_y$.

An aspect of the present disclosure includes a method of calibrating a single-layer touch-sensor device by using two pairs of calibration capacitors, each pair associated with a different axis of the touch-sensor device. For example, in accordance with an embodiment of the present invention, a method of calibrating a single-layer touch-sensor device includes providing a calibration mechanism coupled with the single-layer touch-sensor device. In an embodiment, the calibration mechanism includes a charge measurement circuit coupled, by a first pair of electrical traces, with a first slider of the single-layer touch-sensor device and coupled, by a second pair of electrical traces, with a second slider of the single-layer touch-sensor device. The first and second sliders are approximately orthogonal to one another. Also included is a first pair of calibration capacitors, each calibration capacitor coupled, between the first slider and the charge measurement circuit, with one of the first pair of electrical traces. A second pair of calibration capacitors is included, each calibration capacitor coupled, between the second slider and the charge measurement circuit, with one of the second pair of electrical traces. Also included is a first pair of connection switches, each connection switch coupled with one of the first pair of calibration capacitors. A second pair of connection switches is included, each connection switch coupled with one of the second pair of calibration capacitors. The first pair of calibration capacitors is connected to the first pair of electrical traces with a first capacitance touch value. Meanwhile, the second pair of calibration capacitors is connected to the second pair of electrical traces with a second capacitance touch value. The first pair of connection switches is connected to the first pair of calibration capacitors in order to generate a first simulated touch result. The second pair of connection switches is connected to the second pair of calibration capacitors in order to generate a second simulated touch result. Finally, the single-layer touch-sensor device is calibrated based on the first and second simulated touch results. In an embodiment, calibrating the single-layer touch-sensor device includes calibrating without the use of a manual touch. In one embodiment, connecting the first and second pairs of connection switches to generate the first and second simulated touch results includes generating the first and second simulated touch results at a set of edges of a panel of the single-layer touch-sensor device. In a specific embodiment, calibrating the single-layer touch-sensor device includes calculating a coordinate gain and a coordinate offset based on a signal change of the panel, the signal change caused by at least one of the calibration capacitors of the first and second pairs of calibration capacitors. In an embodiment, calibrating the single-layer touch-sensor device includes repeating the generating of the first and second simulated touch results periodically to compensate for calibration drift in the single-layer touch-sensor device. In one embodiment, connecting the first and second pairs of calibration capacitors includes connecting with a capacitance touch value approximately in the range of 0.5-5 picofarads.

Figure 14:
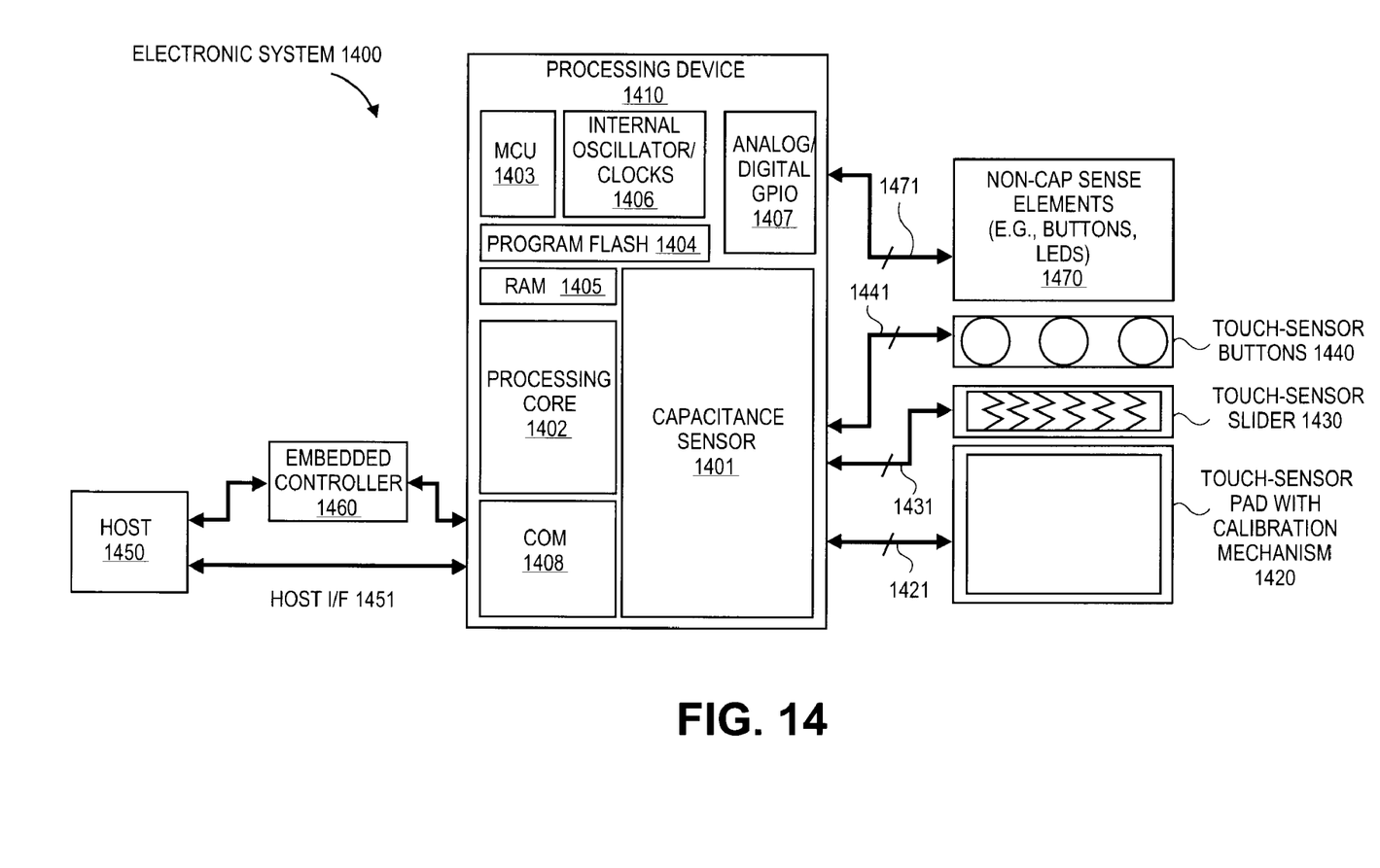
FIG. 14 illustrates a block diagram of an electronic system having a processing device for detecting a presence of a conductive object on a touch-sensor device, in accordance with an embodiment of the present invention.

In an aspect of the present disclosure, an electronic device may be fabricated to include a dual-sensing-mode touch-sensor device having a calibration mechanism coupled therewith. FIG. 14 illustrates a block diagram of an electronic system having a processing device for detecting a presence of a conductive object on a touch-sensor device, in accordance with an embodiment of the present invention.

Referring to FIG. 14, electronic system 1400 includes processing device 1410, touch-sensor pad with a calibration mechanism coupled therewith 1420, touch-sensor slider 1430, touch-sensor buttons 1440, host processor 1450, embedded controller 1460, and non-capacitance sensor elements 1470. The processing device 1410 may include analog and/or digital general purpose input/output ("GPIO") ports 1407. GPIO ports 1407 may be programmable. GPIO ports 1407 may be coupled to a Programmable Interconnect and Logic ("PIL"), which acts as an interconnect between GPIO ports 1407 and a digital block array of the processing device 1410 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 1410 may also include memory, such as random access memory (RAM) 1405 and program flash 1404. RAM 1405 may be static RAM (SRAM) or the like, and program flash 1404 may be a non-volatile storage, or the like, which may be used to store firmware (e.g., control algorithms executable by processing core 1402 to implement operations described herein). Processing device 1410 may also include a memory controller unit (MCU) 1403 coupled to memory 1404 or 1405 and the processing core 1402.

As illustrated, capacitance sensor 1401 may be integrated into processing device 1410. Capacitance sensor 1401 may include analog I/O for coupling to an external component, such as touch-sensor pad with a calibration mechanism coupled therewith 1420, touch-sensor slider 1430, touch-sensor buttons 1440, or other devices. Capacitance sensor 1401 and processing device 1410 are described in more detail below.

It should be noted that the embodiments described herein are not limited to touch-sensor pads for notebook implementations, but can be used in other capacitive sensing implementations, for example, the sensing device may be a touch screen, a touch-sensor slider 1430, or a touch-sensor button 1440 (e.g., capacitance sensing button). It should also be noted that the embodiments described herein may be implemented in sensing technologies other than capacitive sensing, such as resistive, optical imaging, surface acoustical wave (SAW), infrared, dispersive signal, and strain gauge technologies. Similarly, the operations described herein are not limited to notebook pointer operations, but can include other operations, such as lighting control (dimmer), temperature or environmental control, volume control, graphic equalizer control, speed control, or other control operations specifying gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition and numeric keypad operation.

In one embodiment, the electronic system 1400 includes a touch-sensor pad with a calibration mechanism coupled therewith 1420 coupled to the processing device 1410 via bus 1421. Touch-sensor pad with a calibration mechanism coupled therewith 1420 may include a panel having an array of capacitive sensors arranged to function, in a first direction, as a projected capacitance slider and, in a second direction, as a set of independent surface capacitance sensors, as described in embodiments above. In another embodiment, touch-sensor pad with a calibration mechanism coupled therewith 1420 may be a transparent touch screen. In another embodiment, the electronic system 1400 includes a touch-sensor slider 1430 coupled to the processing device 1410 via interconnect 1431. Touch-sensor slider 1430 may be a linear slider. In one embodiment, the sensor elements of the sensor array are capacitance sensor elements. Capacitance sensor elements may be used as non-contact sensors. These sensor elements, when protected by an insulating layer, offer resistance to severe environments.

The electronic system 1400 may include any combination of one or more of touch-sensor pad with a calibration mechanism coupled therewith 1420, touch-sensor slider 1430, or touch-sensor button 1440. In another embodiment, the electronic system 1400 also includes non-capacitance sensor elements 1470 coupled to the processing device 1410 via bus 1471. The non-capacitance sensor elements 1470 may include buttons, light emitting diodes (LEDs), and other user interface devices, such as a mouse, a keyboard, a display, or other functional keys that do not use capacitance sensing. In one embodiment, buses or interconnects 1471, 1441, 1431, and 1421 are a single interconnect. Alternatively, these buses may be configured into any combination of one or more separate buses.

The processing device 1410 may also provide value-added functionality such as keyboard control integration, LEDs, battery charger, and general purpose I/O, as illustrated as non-capacitance sensor elements 1470. Non-capacitance sensor elements 1470 are coupled to the GPIO 1407.

Processing device 1410 may include internal oscillator/clocks 1406 and communication block 1408. The oscillator/clocks block 1406 provides clock signals to one or more of the components of processing device 1410. Communication block 1408 may be used to communicate with an external component, such as a host processor 1450, via host interface (I/F) 1451. Alternatively, processing block 1410 may also be coupled to embedded controller 1460 to communicate with the external components, such as host 1450. Interfacing to the host 1450 can be through various methods. In one exemplary embodiment, interfacing with the host 1450 is done using a standard PS/2 interface to connect to an embedded controller 1460, which in turn sends data to the host 1450 via a low pin count (LPC) interface. In some instances, it may be beneficial for the processing device 1410 to do both touch-sensor pad and keyboard control operations, thereby freeing up the embedded controller 1460 for other housekeeping functions. In another exemplary embodiment, interfacing is done using a universal serial bus (USB) interface directly coupled to the host 1450 via host interface 1451. Alternatively, the processing device 1410 may communicate to external components, such as the host 1450, using industry standard interfaces, such as USB, PS/2, inter-integrated circuit (I2C) bus, or system packet interfaces (SPI). The host 1450 and/or embedded controller 1460 may be coupled to the processing device 1410 with a ribbon or flex cable from an assembly, which houses the sensing device and processing device.

In one embodiment, the processing device 1410 is configured to communicate with the embedded controller 1460 or the host 1450 to send and/or receive data. The data may be a command or alternatively a signal. In an exemplary embodiment, the electronic system 1400 operates in both standard-mouse compatible and enhanced modes. The standard-mouse compatible mode utilizes the HID class drivers already built into the Operating System (OS) software of host 1450. These drivers enable the processing device 1410 and sensing device to operate as a standard pointer control user interface device, such as a two-button PS/2 mouse. The enhanced mode may enable additional features such as scrolling or disabling the sensing device, such as when a mouse is plugged into the notebook. Alternatively, the processing device 1410 may be configured to communicate with the embedded controller 1460 or the host 1450, using non-OS drivers, such as dedicated touch-sensor pad drivers, or other drivers known by those of ordinary skill in the art.

In one embodiment, the processing device 1410 is configured to communicate data (e.g., commands or signals) using hardware, software, and/or firmware, and the data may be communicated directly to the processing device of the host 1450, such as a host processor, or alternatively, may be communicated to the host 1450 via drivers of the host 1450, such as OS drivers, or other non-OS drivers. It should also be noted that the host 1450 may directly communicate with the processing device 1410 via host interface 1451.

In one embodiment, the data sent to the host 1450 from the processing device 1410 includes click, double-click, movement of the pointer, scroll-up, scroll-down, scroll-left, scroll-right, step Back, and step Forward. In another embodiment, the data sent to the host 1450 include the position or location of the one or more conductive objects on the sensing device. Alternatively, other user interface device commands may be communicated to the host 1450 from the processing device 1410. These commands may be based on gestures occurring on the sensing device that are recognized by the processing device, such as tap, push, hop, drag, and zigzag gestures. Alternatively, other commands may be recognized. Similarly, signals may be sent that indicate the recognition of these operations.

Processing device 1410 may reside on a common carrier substrate such as, for example, an integrated circuit (IC) die substrate, a multi-chip module substrate, or the like. Alternatively, the components of processing device 1410 may be one or more separate integrated circuits and/or discrete components. In one exemplary embodiment, processing device 1410 is a Programmable System on a Chip (PSoC®) device, manufactured by Cypress Semiconductor Corporation, San Jose, Calif. Alternatively, processing device 1410 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device is a network processor having multiple processors including a core unit and multiple micro-engines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 1410 may also be done in the host. In another embodiment, the processing device 1410 is the host.

Embodiments of the method and apparatus described herein may be implemented in a fully self-contained dual-sensing-mode touch-sensor pad which outputs fully processed X/Y movement and gesture data signals or data commands to a host. The method and apparatus may also be implemented in a dual-sensing-mode touch-sensor pad which outputs X/Y movement data and also finger presence data to a host, and where the host processes the received data to detect gestures. The method and apparatus may also be implemented in a dual-sensing-mode touch-sensor pad which outputs raw capacitance data to a host, where the host processes the capacitance data to compensate for quiescent and stray capacitance, and calculates X/Y movement and detects gestures by processing the capacitance data. Alternatively, the method and apparatus may be implemented in a dual-sensing-mode touch-sensor pad which outputs pre-processed capacitance data to a host, where the touchpad processes the capacitance data to compensate for quiescent and stray capacitance, and the host calculates X/Y movement and detects gestures from the pre-processed capacitance data.

The electronic system that includes the embodiments described herein may be implemented in a dual-sensing-mode touch-sensor pad of a laptop (e.g., notebook computer). Alternatively, it may be implemented in a wired or wireless keyboard integrating a dual-sensing-mode touch-sensor pad, which is itself connected to a host. Alternatively, it may be implemented as a transparent touch screen. Alternatively, the embodiments may be implemented in a mobile handset (e.g., cellular or mobile phone) or other electronic devices where the dual-sensing-mode touch-sensor pad may operate in one of two or more modes. For example, the dual-sensing-mode touch-sensor pad may operate either as a dual-sensing-mode touch-sensor pad for x/y positioning and gesture recognition, or as a keypad or other arrays of touch-sensor buttons and/or sliders. Alternatively, the dual-sensing-mode touch-sensor pad, although configured to operate in the two modes, may be configured to be used only as a keypad, or only as a single-sensing-mode touch-sensor pad. Alternatively, the electronic device may be used in other applications, such as a personal data assistant (PDA), a kiosk, a keyboard, a television, a remote control, a monitor, a handheld multi-media device, a handheld video player, a handheld gaming device, or a control panel.

Capacitance sensor 1401 may be integrated into the processing device 1410, or alternatively, in a separate IC. Alternatively, descriptions of capacitance sensor 1401 may be generated and compiled for incorporation into other integrated circuits. For example, behavioral level code describing capacitance sensor 1401, or portions thereof, may be generated using a hardware description language, such as VHDL or Verilog, and stored to a machine-accessible medium (e.g., Flash ROM, CD-ROM, hard disk, floppy disk, or the like). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1401.

It should be noted that the components of electronic system 1400 may include all the components described above. Alternatively, electronic system 1400 may include only some of the components described above, or include additional components not listed herein.

In one embodiment, capacitance sensor 1401 is a capacitive sense relaxation oscillator (CSR). The CSR may include a current-programmable relaxation oscillator, an analog multiplexer, digital counting functions, and high-level software routines to compensate for environmental and physical sensor element variations.

It should be noted that there are various known methods for measuring capacitance. Although some embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, sigma-delta modulators, charge-accumulation circuits, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitance values may specify very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 1410. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is discharged. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Thus, a single-layer touch-sensor device having a calibration mechanism coupled therewith has been disclosed. In accordance with an embodiment of the present invention, the single-layer touch-sensor device having the calibration mechanism coupled therewith includes a charge measurement circuit coupled, by a pair of electrical traces, with a slider of the single-layer touch-sensor device. A pair of calibration capacitors is included, each calibration capacitor coupled, between the slider and the charge measurement circuit, with one of the pair of electrical traces. A pair of connection switches is also included, each connection switch coupled with one of the pair of calibration capacitors. In one embodiment, the calibration mechanism is configured to calibrate the single-layer touch-sensor device without the use of a manual touch.

What is claimed is:

1. An apparatus comprising a calibration mechanism coupled with a single-layer touch-sensor device, the calibration mechanism comprising: a charge measurement circuit coupled, by a pair of electrical traces, with the single-layer touch-sensor device; a pair of calibration capacitors, each calibration capacitor coupled with one of the pair of electrical traces and disposed between the single-layer touch-sensor device and the charge measurement circuit; a pair of connection switches, each connection switch coupled with one of the pair of calibration capacitors; and wherein the calibration mechanism is configured to calibrate the single-layer touch-sensor device by applying a capacitance touch value from the pair of calibration capacitors using the pair of connection switches, wherein the capacitance touch value simulates a touch on the single-layer touch-sensor device.

2. The apparatus of claim 1, wherein the calibration mechanism is configured to calibrate the single-layer touch-sensor device without the use of a manual touch.

3. The apparatus of claim 2, further comprising a panel having a set of edges, the panel coupled with the single-layer touch-sensor device, wherein the pair of calibration capacitors is configured to simulate touch at the set of edges of the panel.

4. The apparatus of claim 3, wherein the calibration mechanism is configured to calculate a coordinate gain or a coordinate offset based on a signal change of the panel, the signal change caused by at least one of the pair of calibration capacitors.

5. The apparatus of claim 1, wherein the pair of calibration capacitors is housed in the single-layer touch-sensor device.

6. The apparatus of claim 1, wherein the pair of calibration capacitors is housed external to the single-layer touch-sensor device.

7. The apparatus of claim 1, wherein the pair of connection switches is a pair of analog switches.

8. The apparatus of claim 1, wherein the pair of connection switches is a pair of digital switches.

9. A method of calibrating a single-layer touch-sensor device, comprising:
coupling a calibration mechanism with the single-layer touch-sensor device, the calibration mechanism comprising:
a charge measurement circuit coupled, by a pair of electrical traces, with the single-layer touch-sensor device;
a pair of calibration capacitors, each calibration capacitor coupled, between the single-layer touch-sensor device and the charge measurement circuit, with one of the pair of electrical traces; and
a pair of connection switches, each connection switch coupled with one of the pair of calibration capacitors;
connecting, to the pair of electrical traces, the pair of calibration capacitors with a capacitance touch value;
connecting, to the pair of calibration capacitors, the pair of connection switches to generate a simulated touch result; and
calibrating the single-layer touch-sensor device based on the simulated touch result.

10. The method of claim 9, wherein calibrating the single-layer touch-sensor device comprises calibrating without the use of a manual touch.

11. The method of claim 9, wherein connecting the pair of connection switches to generate the simulated touch result comprises generating the simulated touch result at a set of edges of a panel of the single-layer touch-sensor device.

12. The method of claim 11, wherein calibrating the single-layer touch-sensor device comprises calculating a coordinate gain or a coordinate offset based on a signal change of the panel, the signal change caused by at least one of the pair of calibration capacitors.

13. The method of claim 9, wherein calibrating the single-layer touch-sensor device comprises repeating the generating of the simulated touch result periodically to compensate for calibration drift in the single-layer touch-sensor device.

14. The method of claim 9, wherein connecting the pair of calibration capacitors comprises connecting with a capacitance touch value approximately in the range of 0.5-5 picofarads.

15. A method of calibrating a single-layer touch-sensor device, comprising:
coupling a calibration mechanism with the single-layer touch-sensor device, the calibration mechanism comprising:
a charge measurement circuit coupled, by a first pair of electrical traces, with a first slider of the single-layer touch-sensor device and coupled, by a second pair of electrical traces, with a second slider of the single-layer touch-sensor device, wherein the first and second sliders are approximately orthogonal to one another;
a first pair of calibration capacitors, each calibration capacitor coupled, between the first slider and the charge measurement circuit, with one of the first pair of electrical traces;
a second pair of calibration capacitors, each calibration capacitor coupled, between the second slider and the charge measurement circuit, with one of the second pair of electrical traces;
a first pair of connection switches, each connection switch coupled with one of the first pair of calibration capacitors; and
a second pair of connection switches, each connection switch coupled with one of the second pair of calibration capacitors;
connecting, to the first pair of electrical traces, the first pair of calibration capacitors with a first capacitance touch value and, to the second pair of electrical traces, the second pair of calibration capacitors with a second capacitance touch value;

connecting, to the first pair of calibration capacitors, the first pair of connection switches to generate a first simulated touch result and, to the second pair of calibration capacitors, the second pair of connection switches to generate a second simulated touch result; and calibrating the single-layer touch-sensor device based on the first and second simulated touch results.

16. The method of claim 15, wherein calibrating the single-layer touch-sensor device comprises calibrating without the use of a manual touch.

17. The method of claim 15, wherein connecting the first and second pairs of connection switches to generate the first and second simulated touch results comprises generating the first and second simulated touch results at a set of edges of a panel of the single-layer touch-sensor device.

18. The method of claim 17, wherein calibrating the single-layer touch-sensor device comprises calculating a coordinate gain or a coordinate offset based on a signal change of the panel, the signal change caused by at least one of the calibration capacitors of the first and second pairs of calibration capacitors.

19. The method of claim 15, wherein calibrating the single-layer touch-sensor device comprises repeating the generating of the first and second simulated touch results periodically to compensate for calibration drift in the single-layer touch-sensor device.

20. The method of claim 15, wherein connecting the first and second pairs of calibration capacitors comprises connecting with a capacitance touch value approximately in the range of 0.5-5 picofarads.

* * * * *